June 25, 1963  R. W. GIDDINGS ETAL  3,095,431
INTERESTERIFICATION PROCESS
Filed June 17, 1960
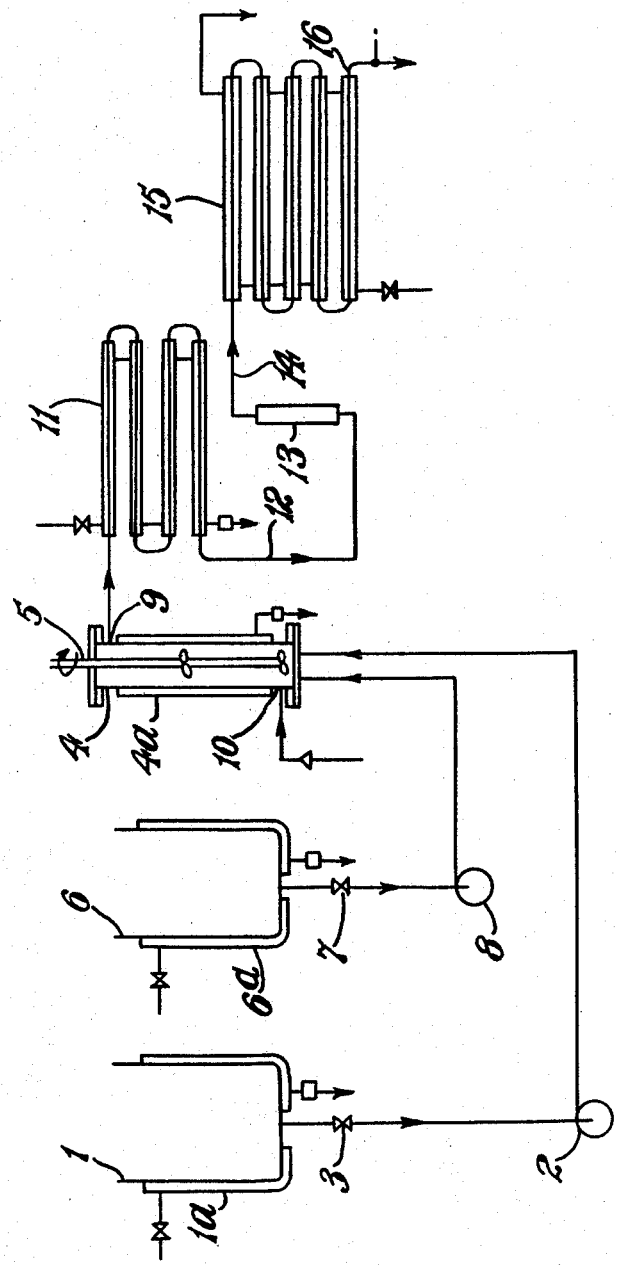
INVENTORS.
RONALD WILLIAM GIDDINGS &
ALAN CHARLES DAVIES
BY Brumbaugh, Free, Graves & Donohue
    their     ATTORNEYS.

United States Patent Office 3,095,431
Patented June 25, 1963

3,095,431
INTERESTERIFICATION PROCESS
Ronald William Giddings, Liverpool, and Alan Charles Davies, Bebington, Chester, England, assignors to Lever Brothers Company, New York, N.Y., a corporation of Maine
Filed June 17, 1960, Ser. No. 36,805
Claims priority, application Great Britain June 17, 1959
5 Claims. (Cl. 260—410.7)

The present invention relates to the continuous interesterification of polyglycerides with polyhydric alcohols. In this specification the prefix "poly" is intended to include "di" and by "polyglycerides" is meant di- and triglycerides, that is, esters of glycerol in which at least two of the hydroxy groups of the glycerol are esterified.

The continuous interesterification of polyglycerides by reaction with polyhydric alcohols at elevated temperatures in the presence of suitable catalysts is known. It is known, for instance, to make monoglycerides by a continuous process of this kind in which di- or tri-glycerides are reacted with a polyhydric alcohol.

The present invention provides a process for the continuous liquid-phase interesterification of a polyglyceride by means of a polyhydric alcohol in the presence of a catalyst during passage through a heated reaction zone, wherein free oxygen is substantially excluded from said reaction zone and a gas stream composed substantially of an inert gas is continuously fed into the stream of reactants and caused to flow with said stream through said zone. By an inert gas is meant a gas which, under the reaction conditions, does not react with the reactants used or products obtained. The di- or tri-glyceride used may or may not be in admixture with monoglyceride. The time of reaction is preferably of the order of a few minutes.

The polyglycerides of fatty acids (and especially the tri-glycerides of such acids) are of most importance as starting materials. These include the polyglycerides of animal oils and fats such as tallow and lard, and vegetable oils such as soya bean oil and palm oil, and partially or fully hardened animal, marine, and vegetable oils, for instance hardened tallow, hardened whale oil and hardened groundnut oil. A particularly important application of the invention is in the preparation of monoglycerides from edible natural glyceride oils, refined and/or hardened as may be necessary to obtain products of the desired character.

Suitable polyhydric alcohols include glycerol, mannitol, and alkylene glycols such as ethylene and propylene glycols and polyethylene glycols.

Suitable catalysts or catalyst-forming materials for use in the process include alkali metal alkoxides, for example, sodium methoxide and sodium ethoxide, and alkali metal hydroxides, particularly sodium hydroxide. These substances probably form soaps which promote reaction and the soaps themselves may also be used as catalysts.

Preferably in making monoglycerides from polyglycerides, the inert gas is nitrogen, the polyhydric alcohol is glycerol and the catalyst is sodium hydroxide or reaction products of sodium hydroxide and the polyglycerides; the reaction temperature, that is the temperature of the reaction mixture in the reaction zone, is 200 to 275° C. especially 220 to 260° C. The reaction time at this temperature is very short, for instance, 1 to 4 or 5 minutes.

It is desirable to pre-heat the reactants, before mixing, to a temperature somewhat less than the reaction temperature. For instance, when the reaction temperature is about 250° C. the polyglyceride may be heated to 80 to 100° C. The catalyst or catalyst-forming compound may be fed into a reactant mixing vessel in the form of a solution in glycerol at 100 to 140° C.

The inert gas is preferably introduced into the reaction mixture at a stage at which that mixture is well below the temperature obtaining in the reaction zone, the gas flowing with the reaction mixture and being exhausted at the monoglyceride product outlet.

In this way from natural edible glyceride oils products can be obtained containing substantial proportions, for instance 30 to 75%, of monoglyceride and capable of being used without further treatment as emulsifying agents in margarine and other foods. For some purposes glyceride mixtures containing lower proportions of monoglyceride, for instance 1 to 20 or 30%, are required and the process of the invention also enables such products to be obtained. With a view to obtaining a high yield of monoglyceride it is very desirable to cool the reaction mixture quickly on leaving the reaction zone.

The accompanying diagrammatic drawing illustrates a preferred form of apparatus for carrying out the process of the invention.

Referring to the drawing: the outlet of a stainless steel reservoir 1, having a jacket 1a, is connected to a metering gear pump 2, via the outlet control valve 3, both providing control of flow to the stainless steel mixing vessel 4, having a jacket 4a, stirrer 5 and nitrogen inlet 10. A smaller stainless steel reservoir 6, having a jacket 6a, is similarly connected to the mixing vessel 4 via an outlet control valve 7 and metering gear pump 8. The outlet 9 of the mixing vessel 4 leads to a jacketed, tubular heater 11, the outlet 12 from which is connected with the stainless steel, vertical reaction vessel 13 which is capable of maintaining its contents at a substantially constant temperature which is connected by a pipe 14 to a tubular cooler 15 having an outlet 16.

In operation fat stock was introduced into the reservoir 1 and maintained at a temperature of 80° C. by the jacket 1a supplied with steam; similarly, glycerol and the alkaline alcoholysis catalyst were introduced into the reservoir 6 and kept at a temperature of 130° C. by means of steam injected into the jacket 6a. The rate of flow of fat stock from the reservoir 1 to the stainless steel, vertical mixing vessel 4 was controlled by the outlet valve 3 and the metering gear pump 2. Similarly, the rate of introduction of catalyst solution into the mixing vessel 4 was controlled by the outlet valve 7 and metering gear pump 8. The mixing vessel 4 was maintained at a temperature of 120° C. by means of steam injected into the jacket 4a at 25 p.s.i.g., and the stirrer 5 ensured adequate mixing of the reactants. The reactant mixture from the outlet 9 together with nitrogen introduced at 10, passed to the heater 11 which was supplied with Dowtherm at 265° C., prior to the mixture entering the reaction vessel 13 in which it was held for 2 minutes at 250° C. At this stage substantially complete chemical equilibrium was reached and the resultant products were cooled rapidly in the cooler 15 which was supplied with cold water. The products were drawn off at the outlet 16 at a temperature of about 100° C.

By carrying out the process described above a monoglyceride, having a relatively low free fatty acid content and improved colour and odour, was obtained.

In the following examples which illustrate the invention, the apparatus used was that specifically described above and was operated as described above.

*Example 1*

Hydrogenated groundnut oil (melting point 57° C.) was fed at a rate of 123 pounds per hour, the glycerol feed rate being 27 pounds per hour. To provide the catalyst 0.25% of anhydrous caustic soda, based on the fat, was dissolved in the glycerol in the feed vessel; the nitrogen feed rate was 3 litres per minute.

Analysis of the product showed it to contain, by weight:

| | Percent |
|---|---|
| Alpha-monoglyceride | 43.3 |
| Free fatty acid | 0.15 |
| Free glycerol | 7.9 |
| Soap | 1.6 |

The colour of the product, as determined in a Lovibond 1″ cell, was 0.8 red, 3.0 yellow and 0.0 blue.

Example 2

Fully hydrogenated tallow was fed at a rate of 165 pounds per hour, the glycerol feed rate being 25 pounds per hour. To provide the catalyst 0.9% anhydrous caustic soda, based on the fat, was dissolved in the glycerol; the nitrogen feed rate was 3 litres per minute.

Analysis of the product showed it to contain, by weight:

| | Percent |
|---|---|
| Alpha-monoglyceride | 35.2 |
| Free fatty acid | 0.2 |
| Free glycerol | 4.0 |
| Soap | 4.7 |

The colour of the product, as determined in a Lovibond 1″ cell, was 0.8 red, 2.0 yellow and 0.0 blue.

Example 3

Hydrogenated whale oil (melting point 57° C.) was fed at a rate of 123 pounds per hour, the glycerol feed rate being 27 pounds per hour. To provide the catalyst 0.25% of anhydrous caustic soda, based on the fat, was dissolved in the glycerol; the nitrogen feed rate was 3 litres per minute.

Analysis of the product showed it to contain, by weight:

| | Percent |
|---|---|
| Alpha-monoglyceride | 40.6 |
| Free fatty acid | 0.28 |
| Free glycerol | 6.9 |
| Soap | 2.0 |

The colour of the product, as determined in a Lovibond 1″ cell, was 1.0 red, 3.3 yellow and 0.0 blue.

In a comparative trial carried out as in Example 1 but omitting the amount of nitrogen, the product contained 0.60% of free fatty acid and the colour, determined as before, was 1.2 red, 3.9 yellow and 0.3 blue.

What is claimed is:

1. A process for the continuous liquid-phase interesterification of glycerides consisting essentially of esters of glycerol in which at least two of the hydroxyl groups of the glycerol are esterified, which comprises continuously feeding the glyceride together with a polyhydric alcohol, an interesterification catalyst and an inert gas, in the absence of free oxygen, into and through a reaction zone maintained at a temperature of about 200°–275° C., passing the products issuing from said zone immediately into and through a cooling zone maintained at a temperature below about 100° C., and collecting the products from said cooling zone at a temperature not substantially above 100° C., the products having a free fatty acid content of not more than about 0.28% based on the weight of the products.

2. A process according to claim 1, wherein the glycerides treated are composed of fatty acid esters of glycerol.

3. A process according to claim 1, wherein the glycerides treated are composed of edible fats and the polyhydric alcohol is glycerol.

4. A process according to claim 1, wherein the glycerides treated are composed of edible fats, the catalyst is an lakali metal hydroxide, and the polyhydric alcohol is glycerol.

5. A process according to claim 1, wherein the glycerides treated are composed of edible fats, the catalyst is an alkali metal hydroxide, the inert gas is nitrogen, and the polyhydric alcohol is glycerol.

References Cited in the file of this patent
UNITED STATES PATENTS

| 2,309,949 | Gooding | Feb. 2, 1943 |
| 2,320,844 | Black | June 1, 1943 |
| 2,442,534 | Eckey | June 1, 1948 |